United States Patent
Zink et al.

(10) Patent No.: US 6,802,793 B2
(45) Date of Patent: Oct. 12, 2004

(54) CROSS PIN RETENTION SYSTEM FOR DIFFERENTIALS

(75) Inventors: Frederick E. Zink, Capac, MI (US); Joseph M. Endreszl, Westland, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 10/368,173

(22) Filed: Feb. 17, 2003

(65) Prior Publication Data

US 2004/0162177 A1 Aug. 19, 2004

(51) Int. Cl.[7] ............................................. F16H 48/06
(52) U.S. Cl. ......................................................... 475/230
(58) Field of Search ................................ 475/220, 230, 475/231

(56) References Cited

U.S. PATENT DOCUMENTS

| | | | |
|---|---|---|---|
| 1,544,363 A | * | 6/1925 | Alden ........................ 475/230 |
| 3,608,049 A | | 9/1971 | Tavella |
| 3,872,741 A | | 3/1975 | Berchtold et al. |
| 3,904,731 A | | 9/1975 | Orkin et al. |
| 4,289,047 A | | 9/1981 | Hopkins |
| 4,762,024 A | | 8/1988 | Graft |
| 4,808,934 A | * | 2/1989 | Yokoyama et al. ..... 324/207.25 |
| 4,864,890 A | | 9/1989 | Friedrich et al. |
| 5,131,894 A | | 7/1992 | Hilker |
| 5,273,498 A | | 12/1993 | Dhillon et al. |
| 5,304,103 A | * | 4/1994 | Schlosser .................... 475/230 |
| 5,545,102 A | | 8/1996 | Burgman et al. |
| 5,824,348 A | | 10/1998 | Fujiu et al. |
| 5,857,936 A | | 1/1999 | Ishikawa |
| 5,897,452 A | | 4/1999 | Schreier et al. |
| 5,976,050 A | | 11/1999 | Irwin |
| 5,980,417 A | | 11/1999 | Wopshall, Jr. |
| 6,024,665 A | | 2/2000 | Hauser |
| 6,061,907 A | | 5/2000 | Victoria et al. |
| 6,652,408 B2 | * | 11/2003 | Rutt et al. ................... 475/230 |

* cited by examiner

Primary Examiner—Roger Pang
(74) Attorney, Agent, or Firm—Harness, Dickey & Pierce, P.L.C.

(57) ABSTRACT

An arrangement for securely retaining a cross pin within a differential assembly includes a cross pin having a groove positioned proximate a recess formed in a differential housing. The recess and the groove define a retention passageway at least partially filled with molten resin. Solidified resin material positioned within the retention passageway retains the cross pin in the differential housing. Another embodiment cross pin retention system includes a pair of locking clips coupled to the cross pin. Each of the pinion gears of the differential assembly is retained between one of the locking clips and the differential housing.

13 Claims, 4 Drawing Sheets

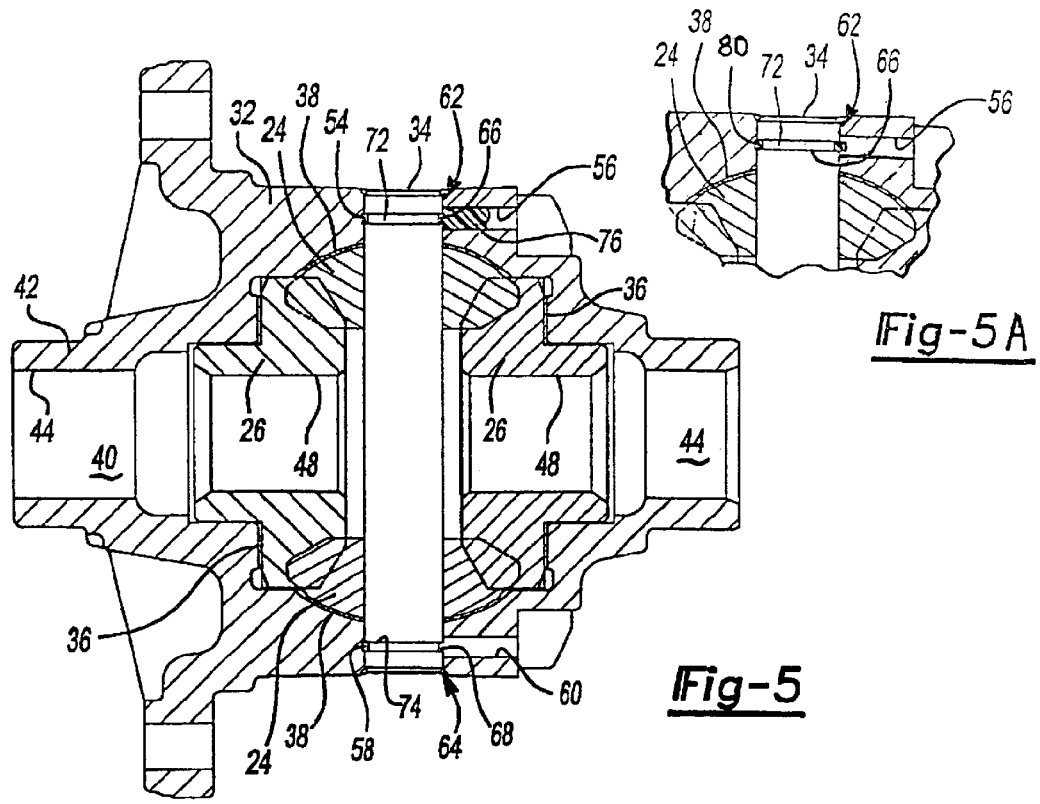
*Fig-5A*
*Fig-5*
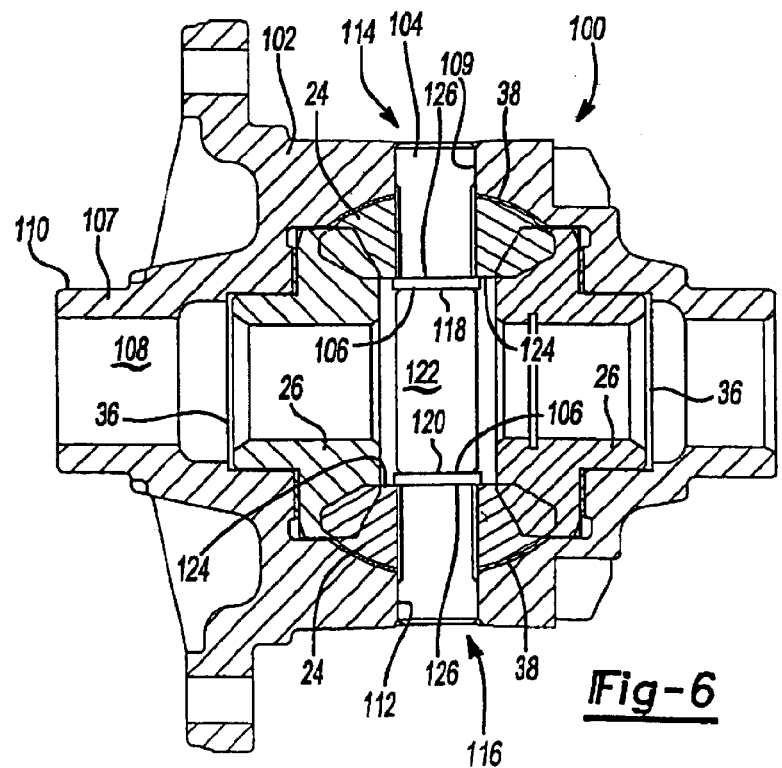
*Fig-6*

CROSS PIN RETENTION SYSTEM FOR DIFFERENTIALS

BACKGROUND OF THE INVENTION

The present invention relates generally to differentials for use in automotive drive lines and, more particularly, to a mechanism for retaining a cross pin within a differential case.

Many automotive drive axles include a hypoid gear set for changing the direction of power transmission from an axis parallel to the direction of vehicle travel to an axis perpendicular thereto. The hypoid gear set includes a ring gear coupled to the differential housing and a pinion gear generally supported within the axle housing. To facilitate proper function of the drive axle assembly, the differential is mounted on a pair of adjustable differential bearings.

In addition, some automotive drive axles include a differential assembly including a gear set which is supported within a differential housing to facilitate relative rotation between a pair of output shafts. The gear set typically includes a pair of helical side gears that are splined to the ends of axle shafts. The helical side gears are meshed with paired sets of helical pinions generally supported on a cross pin coupled to the differential housing. In response to speed differentiation between the output shafts, torque transmitted through meshed engagement of the side gears and pinions generates thrust forces that are exerted by the gear components against the wall surface of the differential housing to frictionally limit the speed differentiation and proportionally deliver torque between the output shafts.

At least one known differential retains the cross pin in the differential case via a lock screw or bolt. The lock screw is threadingly engaged with a tapped hole in the differential case and further protrudes into an aperture in the differential cross pin. Another known method of retaining the differential cross pin includes positioning a snap ring within a groove in the cross pin and a corresponding groove in the differential case. Unfortunately, these mechanisms require costly machining operations to be performed on the differential case, cross pin or both. Furthermore, the torquing operation required when using a threaded fastener is undesirably time consuming and cost prohibitive. Additionally, component tolerances result in the assembled cross pin having a degree of freedom or "end play" relative to the differential housing. Elimination of the torquing or lock ring assembly steps would be beneficial to reduce the time and cost required to manufacture a differential assembly. Elimination of cross pin end play provides a robust differential assembly less apt to generate noise or prematurely wear.

SUMMARY OF THE INVENTION

The present invention provides an arrangement for securely retaining the cross pin within the differential gear assembly. The improved arrangement for retaining the cross pin permits relatively simple and rapid assembly of the differential. Additionally, the present invention provides methods for producing a reduced cost differential requiring fewer components. Accordingly, costs are further minimized by reducing the time required to handle and install a fewer number of components.

In one embodiment of the present invention, a differential gear assembly includes a cross pin retention system having a cross pin with a groove positioned proximate a recess within a differential housing. The recess and the groove define a retention passageway at least partially filled with resin to retain the cross pin within the differential housing. This embodiment may be serviced by simply driving the cross pin to shear the solidified resin material. A snap ring is positioned within the retention passageway during re-assembly of the serviced differential gear assembly.

In another aspect of the present invention, an alternate embodiment differential gear assembly includes a pair of locking clips coupled to a cross pin. Each pinion gear is retained between one of the locking clips and the differential housing. In this embodiment, the differential housing is not machined to provide a port or passageway for molten resin material nor is the housing machined to provide clearance for a locking bolt. As such, a reduced cost differential assembly may be produced.

Other objects and advantages of the present invention will become apparent to those skilled in the art from the following detailed description of the preferred embodiment, when read in light of the accompanying drawings and the appended claims.

BRIEF DESCRIPTION OF THE DRAWINGS

FIG. 5 is a cross-sectional side view of a differential assembly including a first embodiment cross pin retention system of the present invention;

FIG. 5A is a fragmentary cross-sectional side view of the differential assembly of FIG. 5 after being reassembled using a snap ring; and FIG. 6 is a cross-sectional side view of a differential assembly having a second embodiment cross pin retention system of the present invention.

DETAILED DESCRIPTION OF THE PREFERRED EMBODIMENTS

The following description of the preferred embodiments is merely exemplary in nature and is in no way intended to limit the invention, its application, or uses.

Figure 1:
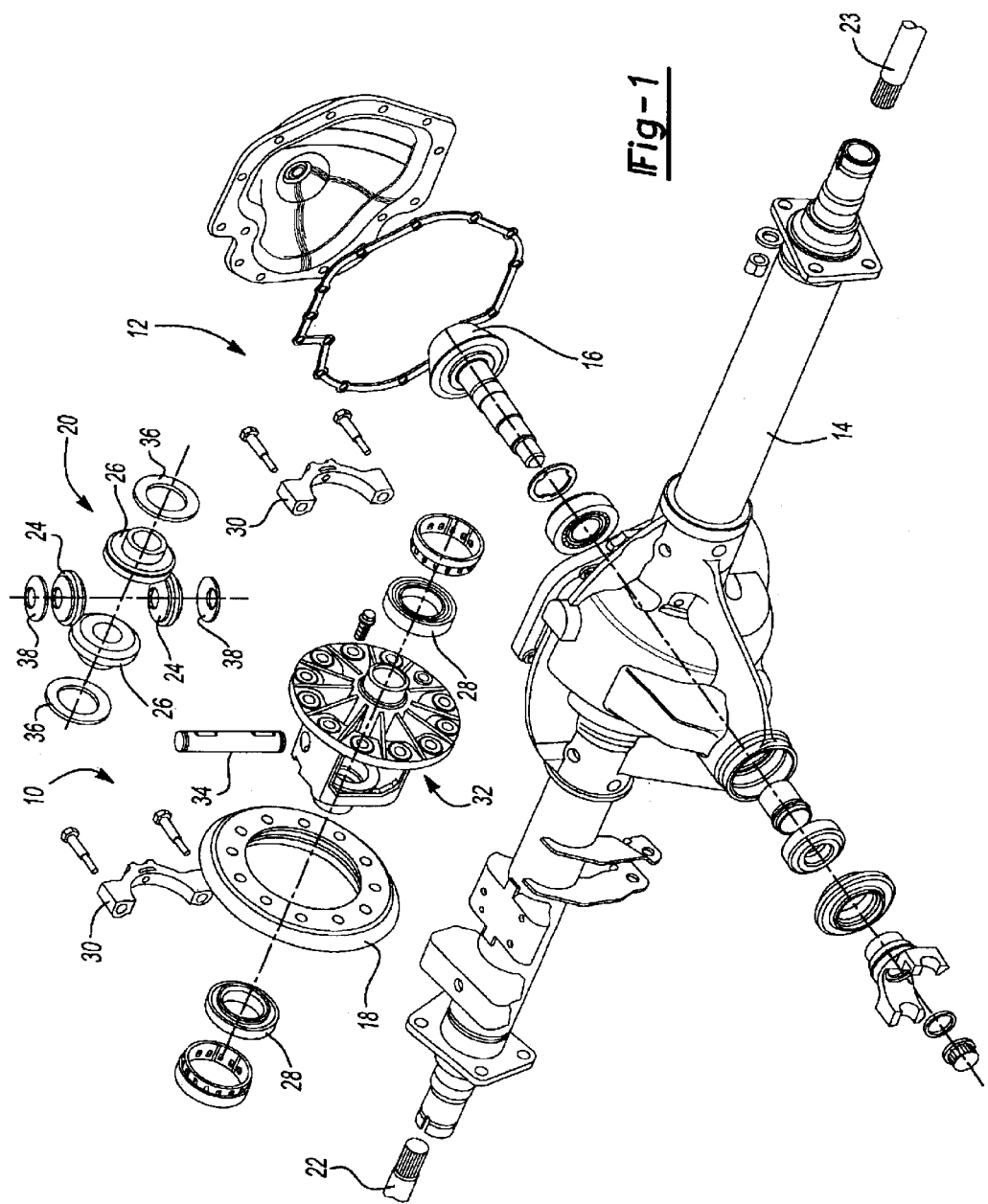
FIG. 1 is an exploded perspective view of an exemplary axle assembly equipped with the cross pin retention system of the present invention.
Figure 2:
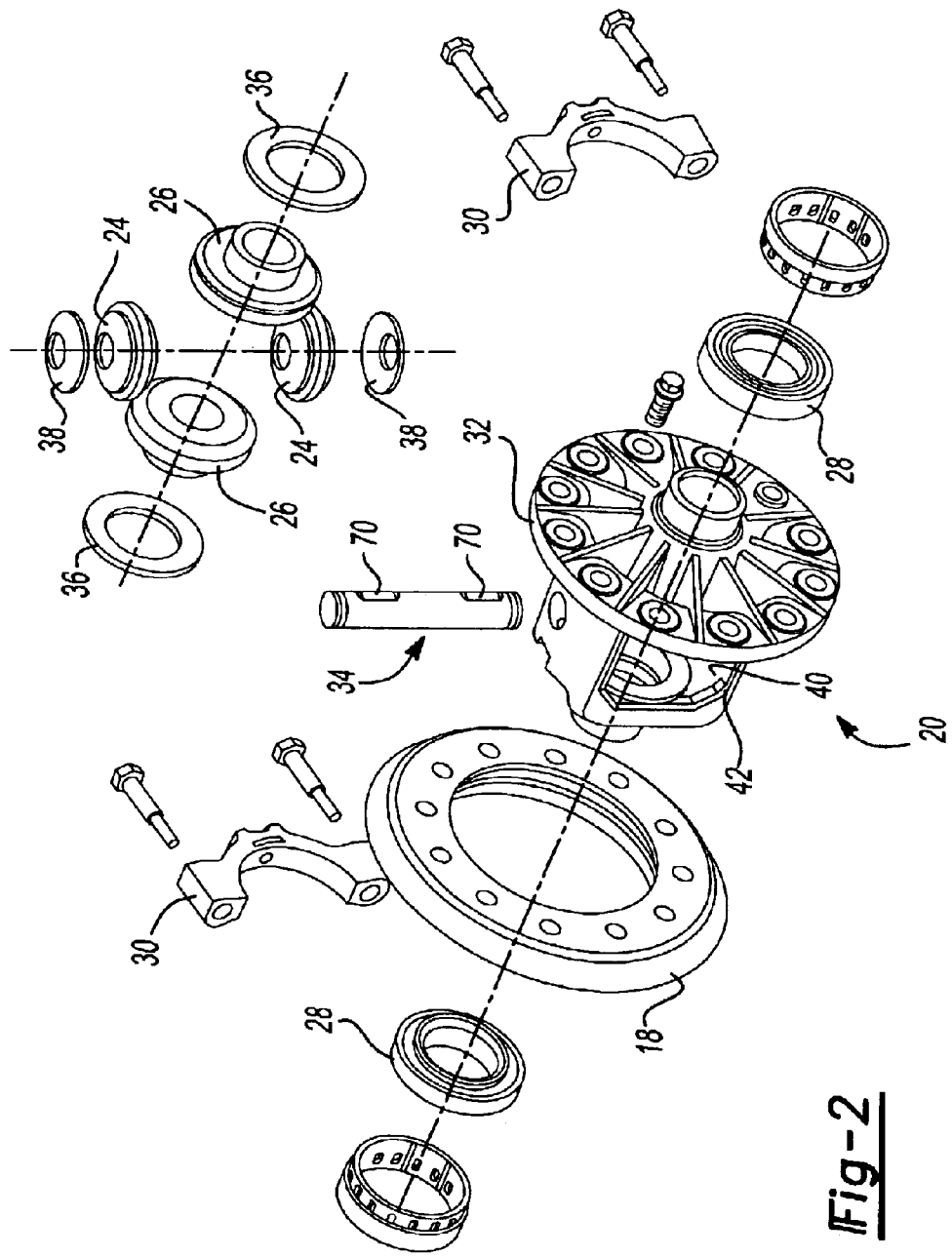
FIG. 2 is an exploded perspective view of a differential assembly having a first embodiment cross pin retention system of the present invention.

With reference to FIGS. 1 and 2, a cross pin retention system constructed in accordance with the teachings of an embodiment of the present invention is generally identified at reference numeral 10. The cross pin retention system is shown operatively associated with an exemplary drive axle assembly 12. As particularly shown in FIG. 1, drive axle assembly 12 is illustrated to generally include an axle housing 14 for rotatably mounting a hypoid gear set including a pinion gear 16 and a ring gear 18 drivingly interconnected to a differential assembly 20. The differential assembly 20 functions to transfer power to a pair of axle shafts 22 and 23 while compensating for any difference in axle shaft speed rotation as may occur during a turn or other steering maneuver. In order to compensate for a differential in axle shaft rotational speed, differential assembly 20 includes a pair of pinion gears 24 and a pair of side gears 26 drivingly interconnected to the axle shafts. To facilitate proper function of the axle assembly 12, differential assembly 20 is rotatably mounted on a pair of differential bearings 28. More particularly, housing 14 includes two semi-circular journals (not shown) for supporting approximately one-half of the circumference of each of the differential bearings 28. A pair of bearing caps 30 generally supports the remaining approximate one-half of each of the differential bearings 28. Each bearing cap 30 is mounted to the axle housing 14 in a manner conventional in the art such as via threaded fasteners.

Figure 3:
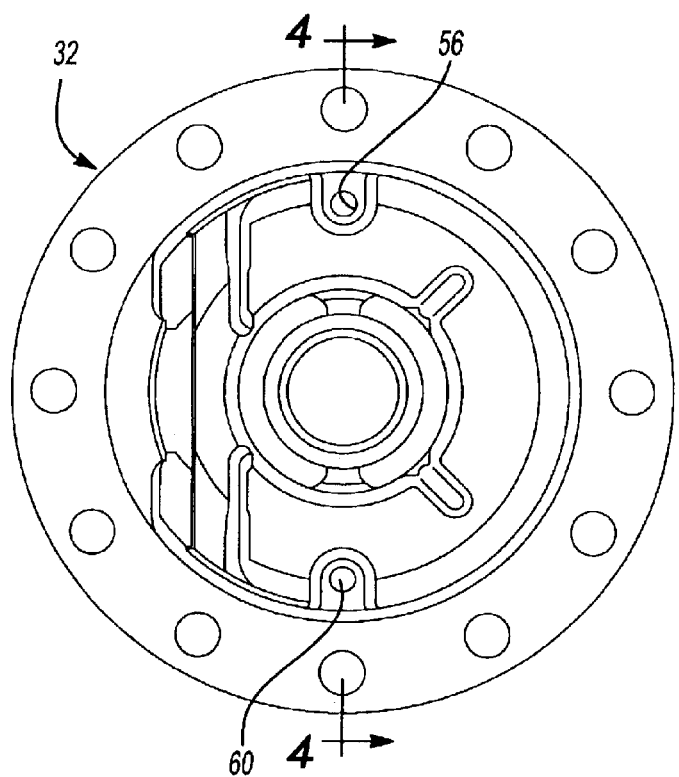
FIG. 3 is an end view of a differential housing constructed in accordance with the teachings of the present invention.
Figure 4:
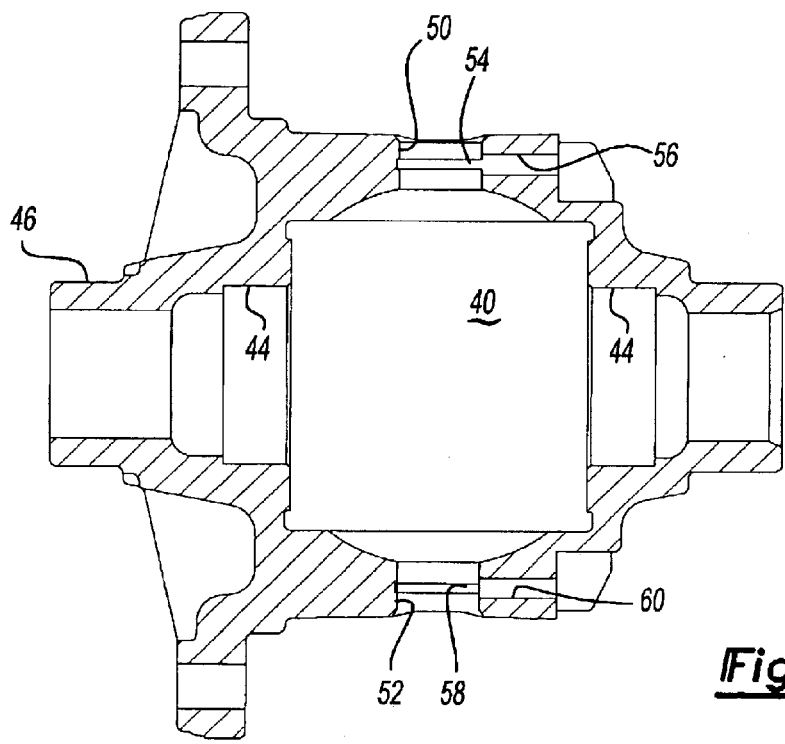
FIG. 4 is a cross-sectional side view of the differential housing depicted in FIG. 3.

Referring to FIGS. 3–5, differential assembly 20 includes a differential case or housing 32, a cross pin 34, a pair of side gear washers 36 and a pair of pinion gear washers 38 as well as pinion gears 24 and side gears 26 previously introduced. Differential housing 32 includes an interior cavity 40 defined by a wall 42. Differential housing 32 includes a pair of axially aligned openings 44 extending through wall 42 and interconnecting interior cavity 40 with an external surface 46 of differential housing 32. Openings 44 are sized to rotatably support side gears 26. Openings 44 also allow axle shafts 22 and 23 to be inserted within interior cavity 40 and engage internal splines 48 of side gears 26.

Differential housing 32 also includes a first aperture 50 and a second aperture 52 substantially axially aligned with one another. Each of first and second apertures 50 and 52 extend through wall 42 to interconnect interior cavity 40 with external surface 46 of differential housing 32. First aperture 50 includes a first recess 54 substantially annularly extending about a portion thereof. A first port 56 extends through wall 42 from external surface 46 to first recess 54. Second aperture 52 includes a second recess 58. A second port 60 extends through wall 42 and is positioned in communication with second recess 58.

Cross pin 34 is a generally cylindrically-shaped member having a first end 62 and a second end 64. First end 62 includes an annular groove 66. Second end 64 includes an annular groove 68. A pair of flats 70 (FIG. 2) are formed on cross pin 34 to function as lubricant reservoirs during operation.

FIG. 5 depicts a complete differential assembly 20 where cross pin 34 is positioned within first and second apertures 50 and 52. Annular groove 66 is aligned with first recess 54 to define a first retention passageway 72. Second end 64 of cross pin 34 is positioned within second aperture 52 such that an annular groove 68 is proximate second recess 58. Second recess 58 and annular groove 68 define a second retention passageway 74.

Pinion gears 24 are rotatably supported on cross pin 34. Pinion gear washers 38 are positioned within interior cavity 40 between wall 42 and pinion gears 24. Each of pinion gear washers 38 provide a thrust surface on which a pinion gear may bear. Similarly, side gear washers 36 are positioned between side gears 26 and differential housing 32.

After the pinion gears and the side gears are positioned in meshing engagement with one another as shown in FIG. 5, a molten resin material 76 is introduced to retain cross pin 34 within differential housing 32. Specifically, molten resin is injected within first port 56 and into first retention passageway 72. The molten resin flows to fill first recess 54 and annular groove 66 thereby fixing the axial position of cross pin 34 relative to differential housing 32 once the resin solidifies. As a redundant retention measure, additional molten resin is injected within second port 60 and into second retention passageway 74. The molten resin is injected to substantially fill second recess 58 and annular groove 68 to further couple cross pin 34 to differential housing 32. As described above, cross pin 34 may be retained within differential housing 32 without the use of a lock pin in a threaded bore. Additionally, cross pin 34 need not be cross drilled to accept a locking bolt.

It should be appreciated that differential assembly 20 is a serviceable assembly should the need arise. Because solidified resin material 76 exhibits substantially lower mechanical properties than cross pin 34 or differential housing 32, differential assembly 20 may be disassembled by shearing solidified resin positioned within the retention passageways by driving cross pin 34 along its longitudinal axis. Once disassembled, the differential assembly may be serviced and reassembled by using a pair of standard snap rings 80 positioned within first retention passageway 72 (FIG. 5A) and second retention passageway 74.

With reference to FIG. 6, a second embodiment cross pin retention system is depicted at reference numeral 100. Second embodiment cross pin retention 100 is useful within a differential assembly including components very similar to those previously described. For clarity, like components are identified with the previously introduced reference numerals.

Cross pin retention system 100 includes a simplified differential housing 102 operating in conjunction with a modified cross pin 104 having locking rings 106 coupling cross pin 104 and differential housing 102. Differential housing 102 is similar to previously described differential housing 32 as having a wall 107 defining an interior cavity 108. Differential housing 102 includes a first aperture 109 interconnecting interior cavity 108 with an exterior surface 110 of differential housing 102. A second aperture 112 is aligned with first aperture 109. Second aperture 112 also interconnects interior cavity 108 with exterior surface 110. Based on the location of locking rings 106, first aperture 109 and second aperture 112 need not include further geometrical features such as first recess 54 and second recess 58 of the previous embodiment. It should be appreciated that ports 56 and 60 may also be eliminated. Accordingly, the cost and time required to machine differential housing 102 is substantially reduced.

Cross pin 104 is a substantially solid cylindrical member having a first end 114 and a second end 116. A first ring groove 118 and a second ring groove 120 are formed on cross pin 104 between first end 114 and second end 116. An intermediate portion 122 of cross pin 104 is located between first ring groove 118 and second ring groove 120. One skilled in the art will note that first end 114 and second end 116 of cross pin 104 are no longer cross-drilled for receipt of a lock bolt. As such, the cost of producing cross pin 104 is reduced.

To assemble the differential assembly equipped with cross pin retention system 100, each of side gears 26 and side gear washers 36 are positioned as shown in FIG. 6. Similarly, pinion gears 24 and pinion gear washers 38 are positioned within interior cavity 108 of differential housing 102. At this time, cross pin 104 is slidingly disposed through first aperture 109, apertures extending through pinion gears 24 and second aperture 112. Locking rings 106 are coupled to cross pin 104. One locking ring 106 is positioned within first ring groove 118. Another locking ring 106 is positioned within second ring groove 120. Each pinion gear 24 includes an end face 124 which abuts an outboard face 126 of each locking ring 106. Based on the location of each of the components previously described, each pinion gear 24 is axially restrained on one side by locking ring 106. Each pinion gear 24 is restrained from axially sliding away from locking ring 106 by pinion gear washer 38, differential housing 102 and side gears 26. Locking rings 106 also function to limit the axial movement of cross pin 104 by trapping intermediate portion 122 between each of pinion gears 24.

The foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A differential gear assembly comprising:

a differential housing adapted to be rotatably supported within an axle housing, said differential housing having an interior chamber, a first aperture and a second aperture, said first and second apertures being substantially axially aligned with each other, said first aperture having an annular recess formed therein;

side gears rotatably supported within said interior chamber of said differential housing;

a cross pin supported in said interior chamber of said differential housing, said cross pin having ends positioned within said first and second apertures, said cross pin having a groove positioned proximate said recess to define a retention passageway;

pinion gears rotatably supported on said cross pin and in meshed engagement with said side gears; and resin material positioned within said retention passageway to retain said cross pin in said differential housing.

2. The differential gear assembly of claim 1 wherein said groove is an annular depression extending about the circumference of said cross pin.

3. The differential gear assembly of claim 1 wherein said differential housing includes a port interconnecting said recess and an outer surface of said differential housing.

4. The differential gear assembly of claim 3 wherein said resin material at least partially fills said port.

5. The differential gear assembly of claim 4 wherein said second aperture includes a recess, said cross pin includes a second groove and wherein said differential gear assembly includes additional resin material positioned within said recess of said second aperture and said second groove.

6. A differential gear assembly comprising:

a differential housing adapted to be rotatably supported within an axle housing, said differential housing having an interior chamber, a first aperture and a second aperture, said first and second apertures being substantially axially aligned with each other, said first aperture having a recess formed therein;

side gears rotatable supported within said interior chamber of said differential housing;

a cross pin supported in said interior chamber of said differential housing, said cross pin having ends positioned within said first and second apertures, said cross pin having a groove positioned proximate said recess to define a retention passageway;

pinion gears rotatably supported on said cross pin and in meshed engagement with said side gears; and resin material positioned within said retention passageway to retain said cross pin in said differential housing, wherein said recess and said groove are configured to receive a snap ring to retain said cross pin after said resin material is removed during disassembly of said differential gear assembly.

7. A method for assembling a differential gear assembly comprising:

positioning a pair of side gears in meshing engagement with a pair of pinion gears within a differential housing;

positioning a cross pin to rotatably support each of said pinion gears within said differential housing, said cross pin including a groove and said differential housing including an annular recess;

positioning said groove proximate said annular recess to define a retention passageway; and at least partially filling said retention passageway with a molten resin material to retain said cross pin within said differential housing.

8. The method of assembling a differential gear assembly of claim 7 further including injecting molten resin into a port extending from an exterior surface of said differential housing to said retention passageway.

9. The method of assembling a differential gear assembly of claim 8 further including injecting molten resin into a second retention passageway positioned between said cross pin and said differential housing, wherein said second retention passageway is spaced apart from said first retention passageway.

10. The method of assembling a differential gear assembly of claim 7 further including disassembling said differential gear assembly by driving said cross pin out of said differential housing and coupling said cross pin to said differential housing with a snap ring.

11. A differential gear assembly comprising:

a differential housing adapted to be rotatably supported within an axle housing, said differential housing having an interior chamber, a first aperture and a second aperture, said first and second apertures being substantially axially aligned with each other, said first aperture having a recess formed therein, said differential housing including a passageway spaced apart from said first and second apertures and extending from an outer surface of said recess;

side gears rotatably supported within said interior chamber of said differential housing;

a cross pin supported in said interior chamber of said differential housing, said cross pin having ends positioned within said first and second apertures, said cross pin having a groove positioned proximate said recess;

pinion gears rotatably supported on said cross pin and in meshed engagement with said side gears; and resin material positioned within said passageway, said recess and said groove to retain said cross pin in said differential housing.

12. The differential gear assembly of claim 11 wherein said groove is an annular depression extending about the circumference of said cross pin.

13. The differential gear assembly of claim 12 wherein said recess is shaped as an annular depression aligned with said passageway.

* * * * *